United States Patent
Oishi et al.

(10) Patent No.: US 6,826,145 B2
(45) Date of Patent: Nov. 30, 2004

(54) DISK CARTRIDGE AND DRIVE DEVICE HAVING A CLEANING LINER

(75) Inventors: Kengo Oishi, Kanagawa (JP); Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 102 days.

(21) Appl. No.: 10/095,122

(22) Filed: Mar. 12, 2002

(65) Prior Publication Data

US 2002/0157969 A1 Oct. 31, 2002

(30) Foreign Application Priority Data

Mar. 13, 2001 (JP) .......................................... 2001-70759

(51) Int. Cl.⁷ .............................................. G11B 23/03
(52) U.S. Cl. ....................................... 369/291; 360/133
(58) Field of Search ............................... 369/291, 133; 360/133; 206/308.1

(56) References Cited

U.S. PATENT DOCUMENTS

| | | | | |
|---|---|---|---|---|
| 4,652,961 A | * | 3/1987 | Dieffenbach | 360/133 |
| 4,780,784 A | * | 10/1988 | Covington et al. | 360/133 |
| 4,899,244 A | * | 2/1990 | Morse | 360/133 |
| 5,537,389 A | * | 7/1996 | Kuwa et al. | 369/291 |
| 6,021,031 A | * | 2/2000 | Hales et al. | 360/133 |
| 6,078,482 A | * | 6/2000 | Clark et al. | 360/133 |
| 6,198,598 B1 | * | 3/2001 | Meguro | 360/133 |
| 6,314,080 B1 | * | 11/2001 | Watanabe et al. | 369/291 |
| 6,459,677 B1 | * | 10/2002 | Shiomi et al. | 369/291 |
| 6,583,956 B2 | * | 6/2003 | Kikuchi et al. | 360/133 |

FOREIGN PATENT DOCUMENTS

| | | |
|---|---|---|
| JP | 11-312353 | 9/1999 |
| JP | 2000-30395 | 1/2000 |
| JP | 2000-30396 | 1/2000 |
| JP | 2000-30397 | 1/2000 |
| JP | 2000-30398 | 1/2000 |
| JP | 2000-30399 | 1/2000 |
| JP | 2000-030394 | 1/2000 |
| JP | 2000-90626 | 3/2000 |
| JP | 2000-90627 | 3/2000 |
| JP | 2000-90628 | 3/2000 |

* cited by examiner

Primary Examiner—Angel C Castro
(74) Attorney, Agent, or Firm—Sughrue Mion, PLLC

(57) ABSTRACT

A disk cartridge including: a case for storing a disc-like disk medium rotatably, shutter members for opening or closing an opening for access to the disk medium provided in the case, and a covering member for storing the shutter members in a gap with respect to the case. Cleaning members for wiping the shutter members are provided on the outer surface of the case and/or the inner surface of the covering member. Also, a drive device for recording/replaying information on the disk medium. A spindle shaft for holding the disk medium is provided, which can be rotated by a predetermined rotational amount while having the recording surface of the disk medium contacted with a cleaning member provided on the inner surface of the case.

15 Claims, 11 Drawing Sheets

FIG.5
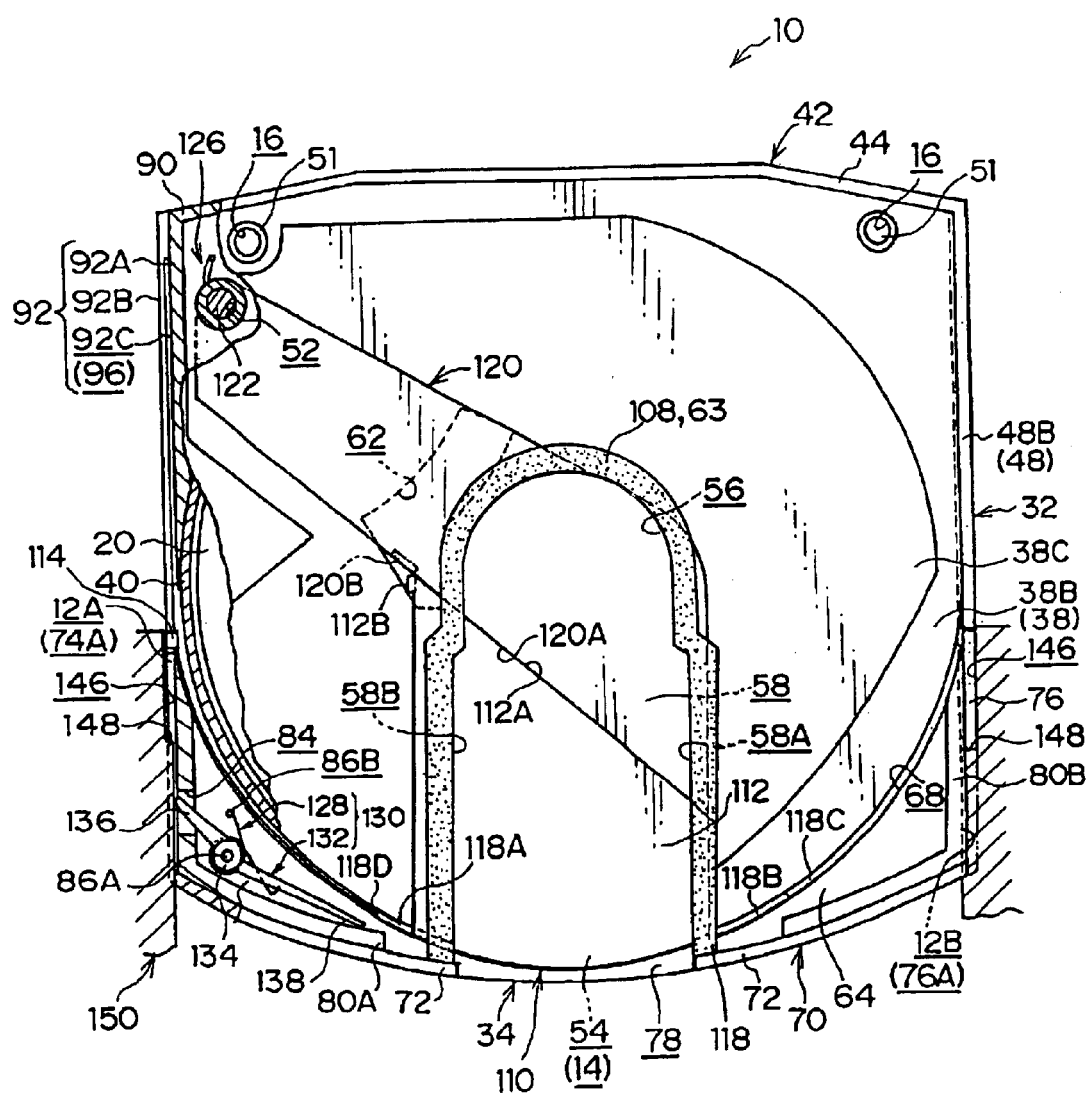
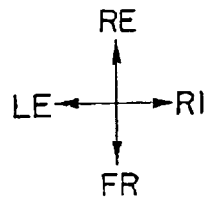

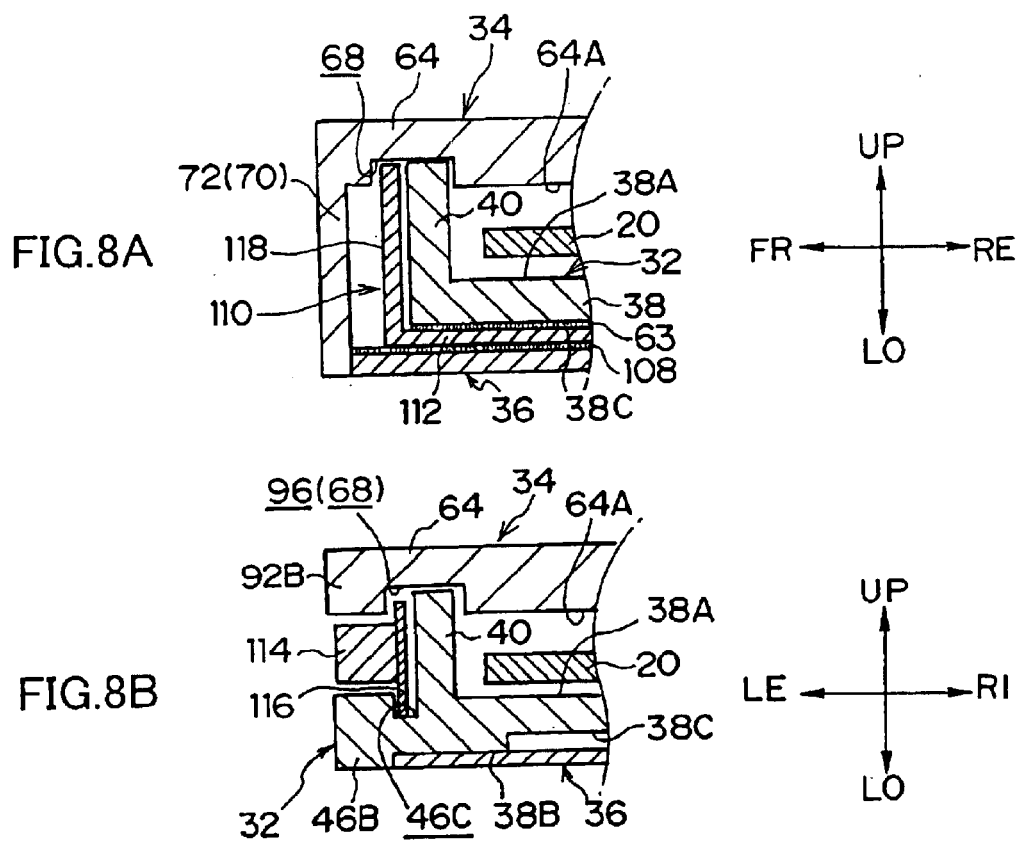

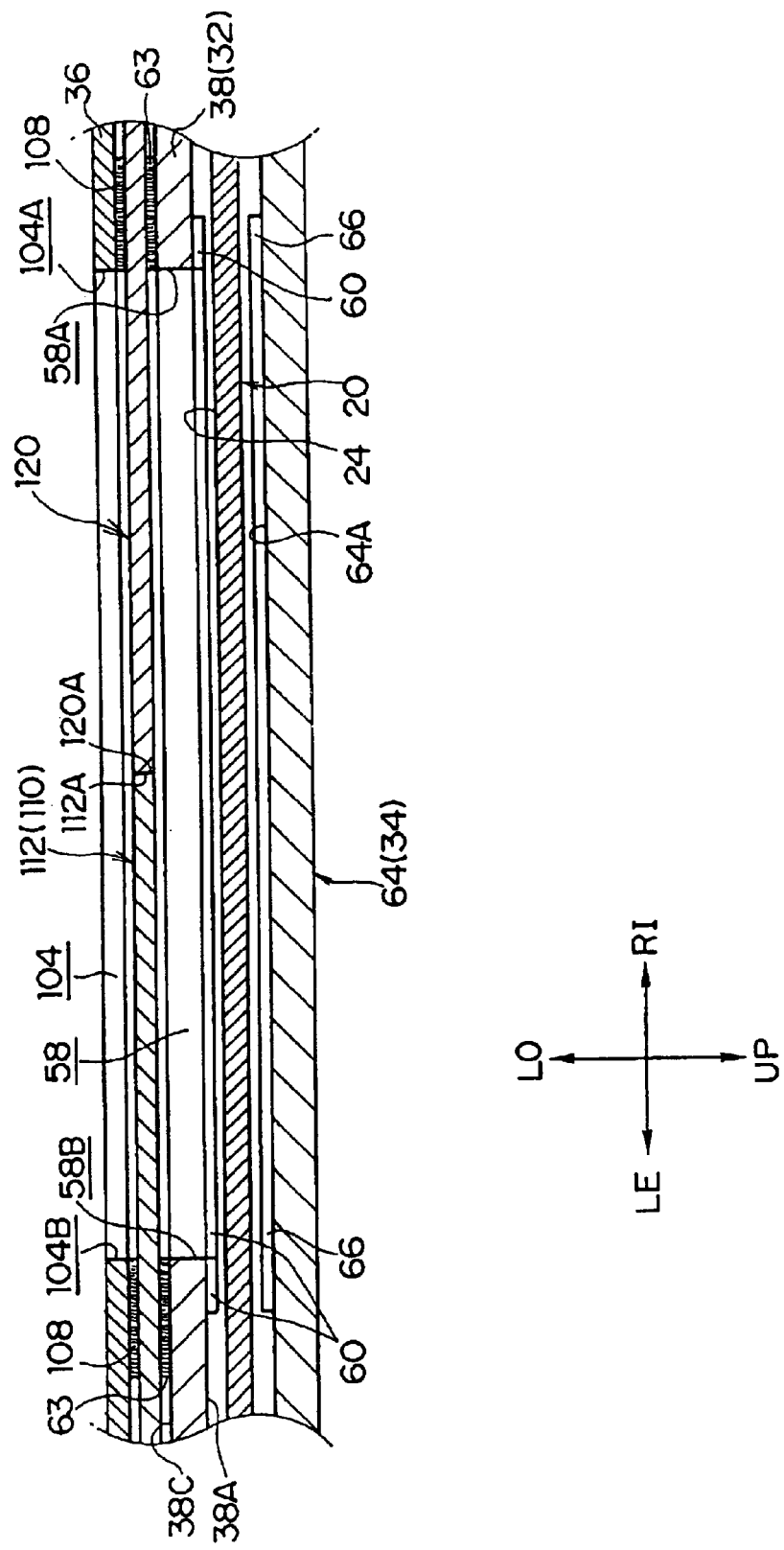

12# DISK CARTRIDGE AND DRIVE DEVICE HAVING A CLEANING LINER

BACKGROUND OF THE INVENTION

1. Field of the Invention

The present invention relates to a disk cartridge for rotatably storing a disc-like disk medium to be used as a recording/replaying medium for an information processing device, or the like, which is capable of preventing ingress of dust and the like, and a drive device with the disk cartridge mounted therein for recording/replaying information.

2. Description of the Related Art

Disc-like disk media such as optical disks and magneto-optical disks have been used, for example, as a portable recording/replaying medium for a computer. According to the disk medium, at a time of recording or reproduction, information can be recorded by pit formation, phase change, magnetization or the like by pigment layer decomposition at a recording surface, by irradiating a laser beam to the recording surface while the medium is being rotated while mounted in a drive device, or the recorded information can be reproduced based on a difference of laser beam reflectance or polarizing angle difference or the like.

Moreover, according to the disk medium, a method of shortening the wavelength of the laser beam to be irradiated to the recording surface has been proposed for improving the recording capacity. When recording/replaying the information using a short wavelength laser beam (such as a blue violet laser), thickness of a covering layer for protecting the disk medium recording surface should be made thin in order to limit laser beam attenuation by the covering layer. When the covering layer thickness is accordingly made thin, a laser beam aperture at a covering layer face of the medium (the surface exposed to the outside) is made smaller, and thus the influence of dust and the like adhering on the covering layer surface becomes unignorable.

Therefore, a disk cartridge storing the disk medium in a case which prevents the adhesion of dust and the like to the disk medium has been adopted. The disk cartridge has a center hole part (center core part) provided at a center part of the disk medium, an opening for exposing a part of the recording surface (the covering layer) to the environment, and a shutter member for opening and closing the opening.

Thus, according to the disk cartridge, when the disk medium is not being used, the opening is closed by the shutter member so as to prevent entrance of dust and the like into the disk cartridge, that is, adhesion of dust and the like to the disk medium. When the disk medium is used, the opening is opened by a mounting operation to the drive device, so as to enable a rotation spindle shaft to hold the center hole part (center core part) and enable approach of the laser head to the recording surface (for irradiation of the laser beam).

However, according to the disk cartridge, since a space for storing the shutter member needs to be provided for when the above-mentioned opening is opened, a problem is involved in that it is difficult to achieve miniaturization of the disk cartridge.

Accordingly, for achieving miniaturization, a disk cartridge with the shutter member divided in two has been proposed in, for example, Japanese Patent Application Laid-Open (JP-A) No. 2000-30394. The disk cartridge disclosed therein comprises a first shutter member mainly for closing the opening part that is for inserting (approaching) the laser head, and a second shutter member mainly for closing the opening part that is for inserting the rotation spindle shaft, such that the entirety of the opening is closed with the shutter members having end faces thereof abutted with each other.

At the time of using the disk cartridge (disk medium), it is mounted (inserted) to the drive device. By the mounting operation, a lock release lever disposed in an arm guide groove is released and a movement operation part interlocked with the first shutter member is moved along the arm guide groove so that the first shutter member is rotated to a direction for opening the opening. Moreover, by this rotation, the second shutter member is pressed by a projection part of the first shutter member contacting with an engaging part thereof, so as to be rotated to another direction for opening the opening, which direction is different from that of the first shutter member.

Thus, the first shutter member and the second shutter member can be stored in a storage space substantially corresponding to a projected area of the disc-like disk medium. Therefore, according to this disk cartridge, miniaturization and a thin shape can be achieved while preventing adhesion of dust and the like to the disk medium.

However, in this conventional disk cartridge, dust and the like are adhered to the first shutter member, the second shutter member, the inside of the case cover and the like by, for example, storage in the atmosphere and friction charges generated by opening and closing operations of the opening. When dust and the like enter into the disk cartridge because of the opening and closing operations of the opening by the first shutter member, and the second shutter member so as to adhere on the recording surface of the disk medium, this results in loss of recording/reproduction signals (so-called 'dropout').

SUMMARY OF THE INVENTION

In consideration of the above-mentioned facts, an object of the present invention is to obtain a disk cartridge having a good dustproofing quality and capable of preventing entrance of dust and the like via a shutter member, and a drive device capable of preferably eliminating dust and the like adhered to a disk medium.

In order to achieve the above-mentioned object, according to one aspect of the present invention, there is provided a disk cartridge including: a medium; a case accommodating the medium and having an access opening for exposing the medium to the environment; a cover plate mounted on an outer surface of the case and having an opening corresponding to the access opening; a shutter disposed between the case outer surface and the cover plate for opening and closing the opening of the cover plate and the access opening; and a cleaner disposed between the shutter and at least one of the case outer surface and the cover plate for wiping the shutter.

According to another aspect of the present invention, there is provided a disk cartridge including: a medium; a case accommodating the medium such that the medium is movable between a first position and a second position; and a cleaning member disposed inside the case for wiping off the medium, wherein at the first position the medium surface-contacts the cleaning member, and at the second position the medium is not in contact with the cleaning member.

According to still another aspect of the present invention, there is provided a drive device to which a disk cartridge is detachably mountable, the disk cartridge including a medium, a case accommodating the medium such that the medium is movable between a first position and a second position, and a cleaning member disposed inside the case for wiping off the medium, at the first position the medium surface-contacting the cleaning member and at the second position the medium being not in contact with the cleaning member, the drive device including: a shift mechanism engageable with the medium of the mounted disk cartridge and capable of moving the medium between the first position and the second position; and a rotating mechanism capable of rotatably driving the medium at each of the first position and the second position.

BRIEF DESCRIPTION OF THE DRAWINGS

FIG. 5 is a view corresponding to FIG. 4 showing a lock release state of the disk cartridge according to the present invention.

FIG. 8A is a cross-sectional view taken on the line F—F of FIG. 4; and

FIG. 8B is a cross-sectional view taken on the line D—D of FIG. 4.

FIG. 9 is a cross-sectional view taken on the line E—E of FIG. 4.

DETAILED DESCRIPTION OF THE EMBODIMENTS

Hereinafter, a disk cartridge 10 according to an embodiment of the present invention will be explained in detail based on the example shown in FIGS. 1A to 9. In the figures, the arrow FR, the arrow RE, the arrow UP, the arrow LO, the arrow LE, and the arrow RI show a front direction (mounting direction), rear direction, upper direction, lower direction, left direction and right direction of the disk cartridge 10 relative to a direction toward a mounting (inserting) direction of the disk cartridge 10 into a drive device 150. Hereinafter, the upper and lower, front and rear, right-left directions correspond to the above-mentioned arrow directions.

These directions are shown for convenience of description, and thus directions at a time of using the disk cartridge 10 are not limited thereby. Therefore, the disk cartridge 10 may in use be disposed, for example, horizontally or vertically.

Figure 1A:
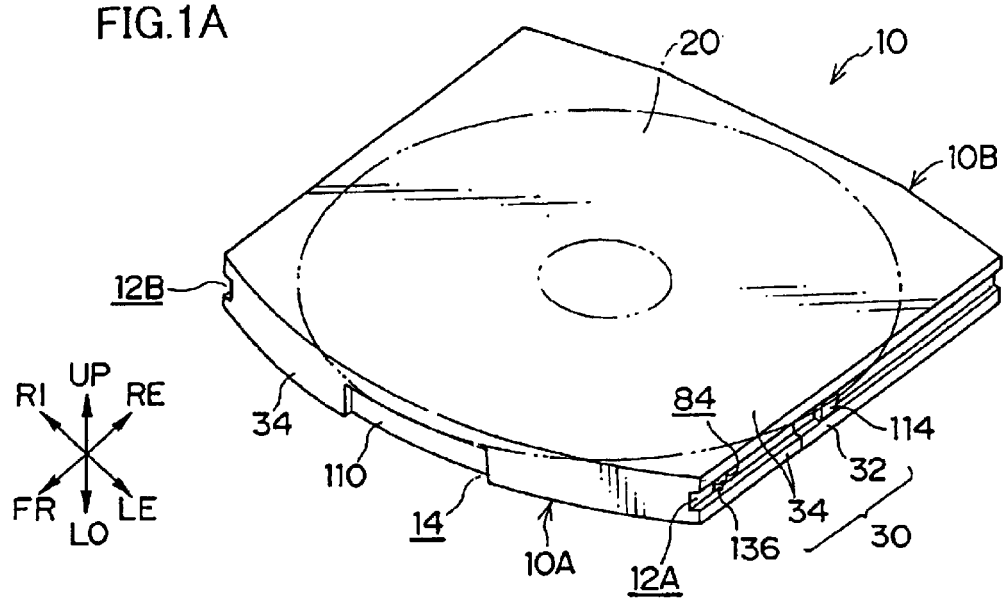
FIG. 1A is a perspective view of a disk cartridge according to the present invention viewed from obliquely above a front side.
Figure 1B:
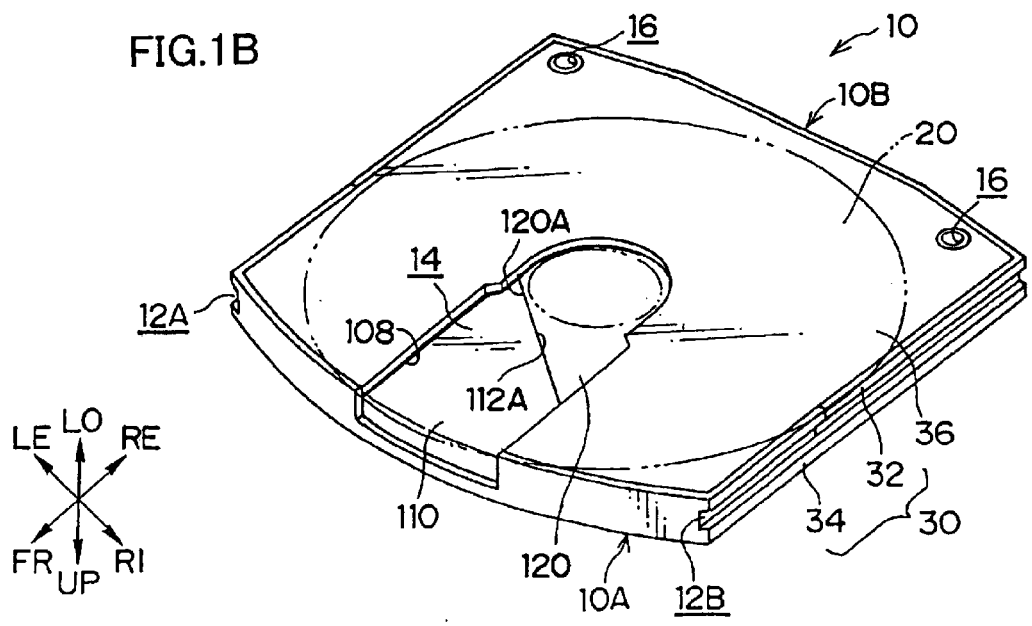
FIG. 1B is a perspective view of the disk cartridge according to the present invention viewed from obliquely below the front side.
Figure 2:
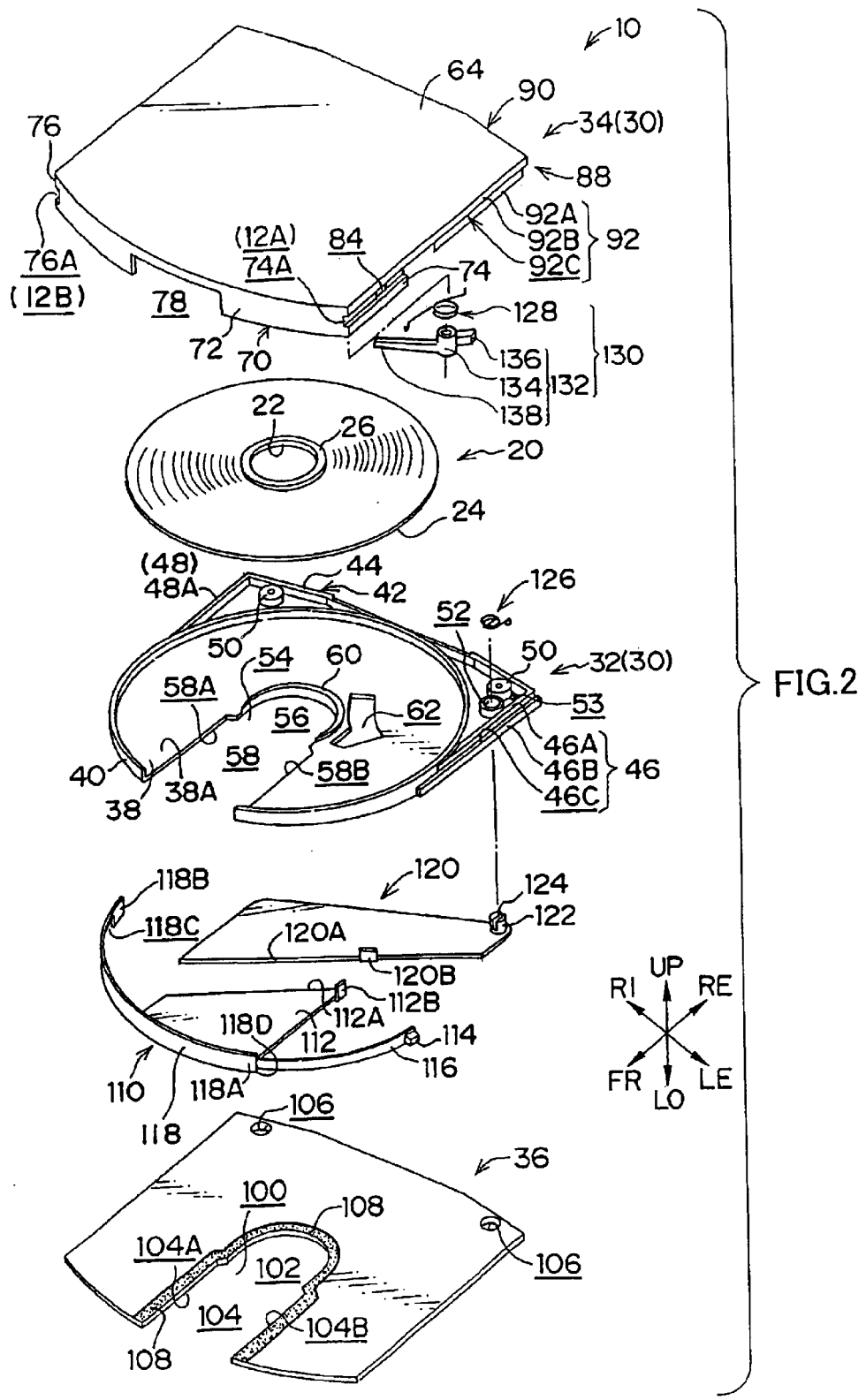
FIG. 2 is an exploded perspective view of the disk cartridge according to the present invention viewed from obliquely above.

First, the schematic configuration of the disk cartridge will be explained. FIG. 1A is a perspective view of the external appearance of the disk cartridge 10 viewed obliquely from above, and FIG. 1B is a perspective view of the disk cartridge 10 viewed obliquely from below. As shown in the figures, the disk cartridge 10 is formed overall in a flat case-like form, with a disc-like disk medium 20 (to be described later) stored as an information recording/replaying medium therein.

The disk cartridge 10 has a front end part 10A curved in an arc-like shape and a rear end part 10B in a polygonal shape with right and left corner parts cut away in accordance with functional requirements. Also, a front-rear direction size of the disk cartridge 10 is formed slightly larger than a right-left direction size thereof. Thus, according to the disk cartridge 10, the mounting direction to the drive device 150 (see FIGS. 4 to 7) can easily be recognized from the external appearance, and a mounting operation to the drive device 150 from a wrong direction is not enabled.

A first guide groove 12A and a second guide groove 12B are provided on right and left side surfaces of the disk cartridge 10 for guiding at the time of the mounting operation to the drive device 150. In the first guide groove 12A, a lock release lever 136 and a shutter engaging part 114 (to be described later) are projected.

Also, an opening 14 is provided from a lower surface center part of the disk cartridge 10 to a center part in the right-left direction of the front wall part of the front end part 10A, for access to the disk medium 20 at the time of using the disk medium 20. That is, at the time of using the disk medium 20, a rotation spindle shaft 142 (see FIGS. 11A to 11D) of the drive device 150 and a recording/replaying head (such as a laser head) 144 (see FIG. 7) approach and are inserted through the opening 14.

When the disk medium 20 is not being used, the opening 14 is closed by a first shutter member 110 and a second shutter part 120 (to be described later), stored in the disk cartridge 10 so as to prevent entrance of dust and the like into the disk cartridge 10. Also, two position limiting holes 16 are provided in the vicinity of the rear end part 10B on the lower surface of the disk cartridge 10 for limiting (detecting) the position of the disk cartridge 10 in the drive device 150.

The disk cartridge 10 is mounted into the drive device 150 from the front side (in the arrow FR direction) while being guided by the drive device 150 via the first guide groove 12A and the second guide groove 12B so as to open the opening 14 so that, in a state with the position detected and positioned in the drive device 150 by the position limiting holes 16, information can be recorded in the disk medium 20 in the drive device 150 or information recorded in the disk medium 20 can be reproduced.

Next, the detailed configuration of the disk cartridge 10 will be explained. As shown in the exploded perspective views of FIGS. 2 and 3, the disk cartridge 10 contains the disk medium 20. The disk medium 20 is formed in a disc-like shape having a center hole 22 in the center part thereof. A recording surface formed on a lower surface 24 thereof is covered with and protected by a covering layer (not shown). Onto the center hole 22 of the disk medium 20, a ring-like center core part 26 is attached by adhesion, or the like. The center core part 26 is engaged, held or adsorbed to a tip end part of the rotation spindle shaft 142 of the drive device 150.

The disk medium 20 is stored in a case 30. The case 30 is provided by bonding a base plate part 32 (a lower shell) and an upper surface plate part 34 (an upper shell). Also, the lower part of the case 30 (base plate part 32) is covered with a lower surface plate part 36 (a covering member) so that a first shutter member 110 and a second shutter member 120 (to be described later) can be stored between the case 30 (base plate part 32) and the lower surface plate part 36.

The base plate part 32 comprises a base bottom part 38 with a thin plate formed in a semicircular shape in the front part and a substantially rectangular shape circumscribing the complementary semicircular portion in the rear part, with a cylindrical wall 40 having the same axis and the same diameter as those of the front side semicircular portion formed projecting upward from the base bottom part 38. The inner diameter of the cylindrical wall 40 is formed slightly larger than the outer diameter of the disk medium 20.

Also, a circumferential wall 42 having a substantial U shape in plan view is formed surrounding substantially the rear half part of the cylindrical wall 40 on the rear part outer circumference of the base bottom part 38. The rear wall 44 of the circumferential wall 42 in a polygonal line shape with the right and left corner part bent in plan view corresponds to the rear end part 10B of the disk cartridge 10 such that the height from the upper surface 38A of the base bottom part 38 is provided lower than the cylindrical wall 40 and it is projected also below the lower surface 38B of the base bottom part 38 (see FIG. 3).

The left wall 46 of the circumferential wall 42 comprises a left inner wall 46A formed with an outer surface thereof provided along a tangent of the front-rear direction of the cylindrical wall 40 and a front end surface in contact with the outer circumferential surface of the cylindrical wall 40, and a left outer wall 46B provided on the outside (left side) of the left inner wall 46A, elongating slightly forward with respect to the front-rear direction center part of the cylindrical wall 40. The left inner wall 46A is provided standing only on the upper surface 38A side of the base bottom part 38, at the same height as the rear wall 44. The left outer wall 46B is formed lower than the left inner wall 46A on the upper surface 38A side and is also provided on the lower surface 38B side at the same height as the rear wall 44. Also, a narrow groove 46C with the upper side opened is formed between the left outer wall 46B and the left inner wall 46A and the cylindrical wall 40.

Conversely, the right wall 48 of the circumferential wall 42 has the same configuration as that of the left wall 46. However, the narrow groove is not formed on the right wall 48 side. Thus, the circumferential wall 42 forms a substantial U shape in plan view with the rear wall 44 and the left inner wall 46A and the right inner wall 48A at the same height on the upper surface 38A side of the base bottom part 38, so as to provide a contact part for the upper surface plate part 34 with respect to a circumferential wall 88, and it forms a substantial U shape in plan view with the rear wall 44 and the left outer wall 46B and the right outer wall 48B at the same height on the lower surface 38B side of the base bottom part 38, so as to provide a fitting part with respect to the lower surface plate part 36.

Also, the outer surface (left side surface) of the left inner wall 46A provides the bottom surface lower part of the first guide groove 12A at the rear part of the disk cartridge 10, the upper end surface of the left outer wall 46B provides the lower side wall surface of the first guide groove 12A at the rear part, the outer surface (right side surface) of the right inner wall 48A provides the bottom surface lower part of the second guide groove 12B at the rear part of the disk cartridge 10, and the upper end surface of the right outer wall 48B provides the lower side wall surface of the second guide groove 12B at the rear part.

A cylindrical projection 50 is provided standing from each of the rear end corner parts of the upper surface 38A of the base bottom part 38 between the cylindrical wall 40 and the circumferential wall 42. The cylindrical projections 50 are provided by the same height as the rear wall 44 of the circumferential wall 42. Although it is not shown, a conical screw receiving part is formed corresponding to a head part of a through hole and a fixing screw head part inside the cylindrical projections 50.

Also, a shutter shaft hole 52 is provided in the vicinity of the left side cylindrical projection 50 for pivoting the second shutter member 120 (to be described later). A spring holding part 53 is provided in the vicinity of the shutter shaft hole 52 for holding one end of a torsion spring 126 (to be described later).

An opening 54 corresponding to the opening 14 of the disk cartridge 10 is formed in the base plate part 32. The opening 54 comprises a round hub hole 56 having a diameter larger than the outer diameter of the center core part 26 of the disk medium 20, and a substantially rectangular window 58 for a recording/replaying head extending along the radial direction of the semicircular portion of the base bottom part 38, symmetrically in the right-left direction, to the outer circumferential front end part, where the cylindrical wall 40 is cut away, communicatingly therewith.

The width size of the recording/replaying head window part 58 in the right-left direction extends to the left and right sides so as to be larger than the diameter of the hub hole 56 except in the vicinity of a part communicating with the hub hole 56. By providing right and left expanded width parts 58A, 58B, a large size recording/replaying head 144 (see FIG. 7) can be inserted. Also, a rib 60 with the upper surface 38A side made thicker is provided around the hub hole 56 of the base bottom part 38.

A shutter guide hole 62 is provided in the vicinity of the hub hole 56 of the base bottom part 38. The shutter guide hole 62 has a shape of an arc-like hole defined by two straight lines radial to the axis of the shutter shaft hole 52 and two arcs concentric with the same, with a front corner portion of the shutter guide hole 62 extended forward.

Figure 3:
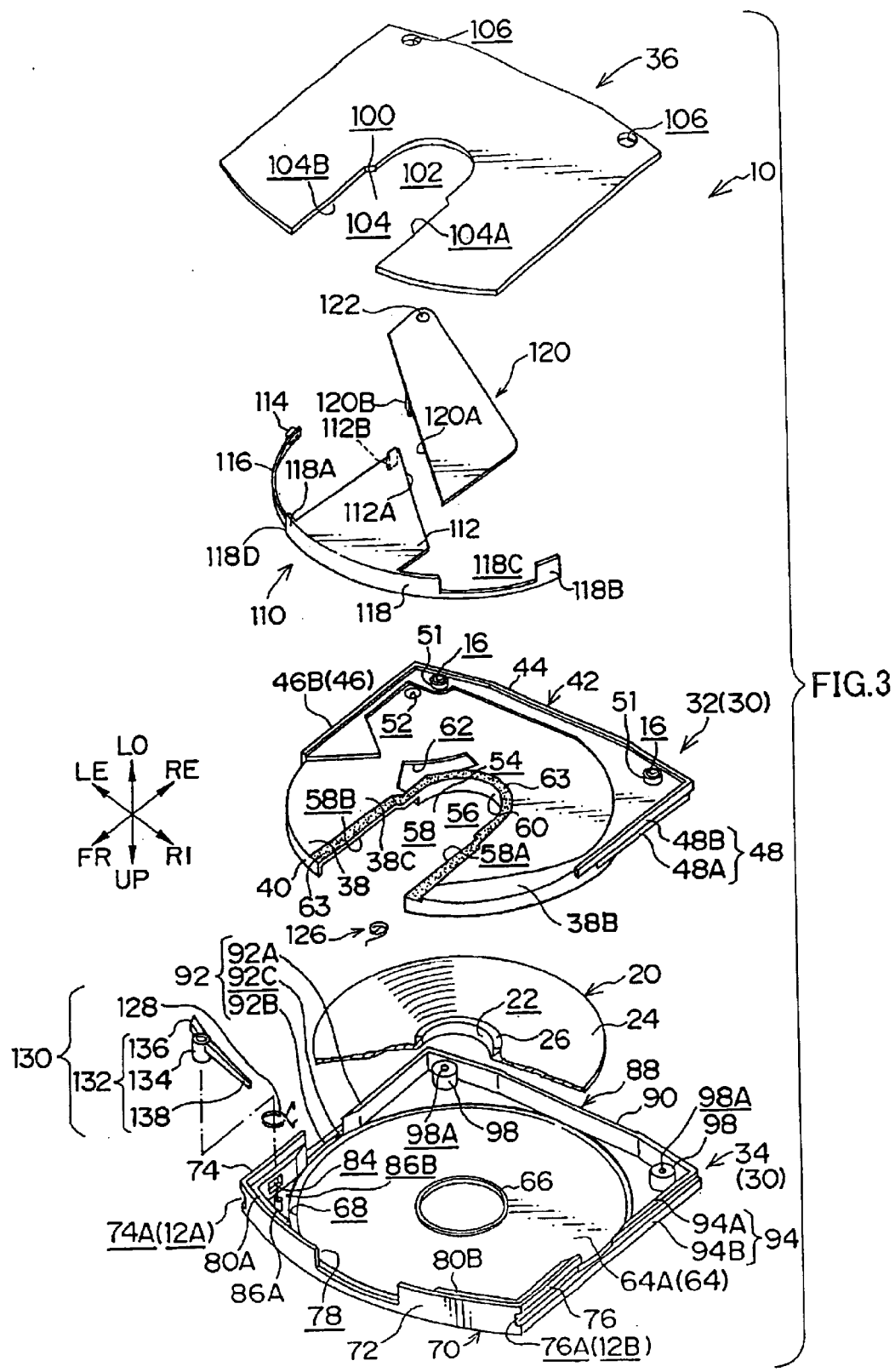
FIG. 3 is an exploded perspective view of the disk cartridge according to the present invention viewed from obliquely below.

Conversely, as shown in FIG. 3, a recess 38C is formed in the lower surface 38B of the base plate part 32 (base bottom part 38) for operation and formation of a storage space of a shutter main body 112 of the first shutter member 110 and the second shutter member 120 (to be described later). That is, on the lower surface 38B side of the base plate part 32, the lower end surface of the circumferential wall 42 is projected downward and the recess 38C is recessed upward with respect to the lower surface 38B of the base bottom part 38.

Thus, since the lower surface plate part 36 is fitted in the circumferential wall 42 in the state in contact with the lower surface 38B, a flat space can be formed between the lower surface plate part 36 and the recess 38C. Also, a cylindrical projection 51 communicating concentrically with the inside of the cylindrical projection 50 is provided standing downward, capable of inserting a screw and a tool at a position of the lower surface 38B of the base bottom part 38 corresponding to the cylindrical projection 50 such that the outer circumference thereof is provided for positioning the lower surface plate part 36 and the inside thereof is provided as the position limiting hole 16 of the above-mentioned disk cartridge 10.

Also, a liner 63 is provided along a rim part circumferential of the opening 54 as a cleaning member, in the recess 38C of the base plate part 32, for cleaning the first shutter member 110 and the second shutter member 120 (to be described later). The liner 63 made of a non-woven fabric in a two layer structure is fixed with the recess 38C by adhesion. The non-woven fabric comprising the liner 63 has a lower layer (layer on the side to be contacted with the first shutter member 110 and the second shutter member 120) containing a large amount of a fiber having a good cleaning property (for example, 30% by weight or more of a rayon fiber) and an upper layer (layer on the side adhered to the recess 38C) made of a fiber having a good holding property for dust and the like (for example, an acrylic fiber and a polyester fiber). Thus, the liner 63 can have a good cleaning property (elimination property) for dust and the like with little risk of detachment of the eliminated dust and the like.

The disk medium 20 is stored inside the cylindrical wall 40 of the above-mentioned base plate part 32. The disk medium 20 is placed on the rib 60 in a state with the center core part 26 thereof inserted in the hub hole 56 so as to prevent contact with the upper surface 38A of the base bottom part 38 and the cylindrical wall 40. In this state, the upper part of the base plate part 32 is covered with the upper surface plate part 34.

The upper surface plate part 34 comprises a flat plate part 64 which is a rectangular flat plate with the front end part curved in an arc-like shape and the rear end part having the right and left corner parts cut away to a polygonal shape. The front-rear direction size of the flat plate part 64 is made slightly larger than the right-left direction size. A ring-like projection 66 is provided in the center part of the lower surface 64A of the flat plate part 64 corresponding to the rib 60 of the base plate part 32 so as to prevent contact with the lower surface 64A of the disk medium 20.

Also, a ring-like groove 68 is formed in the lower surface 64A of the flat plate part 64 corresponding to the cylindrical wall 40 of the base plate part 32. The ring-like groove 68 is formed so as to allow insertion of the cylindrical wall 40 as a whole and the outer diameter of the part on the front side with respect to the left outer wall 46B and the right outer wall 48B of the base plate part 32 is made slightly larger (wider) so as to allow insertion of an arc-like guide wall part 118 of the first shutter member 110 (to be described later) together with the cylindrical wall 40.

An outer wall 70 formed in a substantial U shape in plan view is provided standing downward so as to surround the front half part of the ring-like groove 68 in the front part outer circumference of the flat plate part 64. The outer wall 70, having a height corresponding to the total thickness of the disk cartridge 10, comprises a front wall 72, a left wall 74 and a right wall 76.

The front wall 72, curved corresponding to the curved shape of the flat plate part 64 front end has a rectangular window part 78 with the lower part opened and cut away formed in the right-left direction center part thereof. The window part 78 has a right-left direction width size corresponding to the width size of the recording/replaying head window part 58 in the base plate part 32, so as to provide a part of the opening 14 of the disk cartridge 10. The front wall 72 provides a front end part 10A of the disk cartridge 10.

Also, the left wall 74 and the right wall 76 elongate rearward from the right and left end parts of the front wall 72 so as to have positions of front end parts corresponding to the rear end parts of the left outer wall 46B and the right outer wall 48B of the base plate part 32. That is, in the assembled state, each rear end surface lower part of the left wall 74 and the right wall 76 of the upper surface plate part 34 and the front end surface of the left outer wall 46B and the right outer wall 48B of the base plate part 32 are contacted.

Inside the outer wall 70, inner walls 80A, 80B formed along the right and left corner part inner surfaces are provided. The lower end surfaces of the inner walls 80A, 80B are disposed slightly upward with respect to the lower end surface of the outer wall 70 (recessed toward the inner side of the disk cartridge 10) so as to provide contact surfaces with respect to the upper surface of the lower surface plate part 36 to be fitted into the inner surface of the outer wall 70.

Also, a lateral groove 74A is formed on the outer surface of the left wall 74 of the outer wall 70 along the front-rear direction thereof, with the bottom part thereof reaching to the inner wall 80A. The lateral groove 74A provides the front part of the first guide groove 12A of the disk cartridge 10. Also, the inner wall 80A is provided with a lock release lever hole 84 for communicating the lateral groove 74A bottom part and the inner wall 80A inner side. A lower surface 64A of the flat plate part 64 in the vicinity of the lock release lever hole 84 is provided with a pivot 86A for pivoting a lock lever 132 and a holding hole 86B for holding one end of a torsion spring 128 (to be described later).

Conversely, the right wall 76 of the outer wall 70 is provided in the same manner as the left wall 74 with the lateral groove 76A providing the front part of a second guide groove 12B and the bottom part reaching to the inner wall 80B. On the right wall 76 (inner wall 80B) side, the lock release lever hole, pivot and supporting hole are not provided.

A circumferential wall 88 is provided standing downward corresponding to the circumferential wall 42 of the base plate part 32 on the outer circumference of the flat plate part 64 on the rear side with respect to the outer wall 70. That is, the circumferential wall 88 comprises a rear wall 90, a left wall 92 and a right wall 94, corresponding to the rear wall 44, the left wall 46 and the right wall 48 of the base plate part 32. The rear wall 90 in contact with the rear wall 44 of the base plate part 32 comprises the rear end part 10B of the disk cartridge 10.

Also, the left wall 92 has a left inner wall 92A contacted with the left inner wall 46A of the base plate part 32 and a left outer wall 92B and narrow groove 92C facing the left outer wall 46B and the narrow groove 46C of the base plate part 32 so as to provide the rear part left side wall of the disk cartridge 10 and the rear part of the first guide groove 12A. The narrow grooves 46C, 92C facing with each other provides a shutter guide groove 96 for inserting therein a shutter drawing part 116 of the first shutter member 110 (to be described later).

The shutter guide groove 96 (narrow groove 92C) is communicated with the ring-like groove 68 in the vicinity of the front end part of the left inner wall 92A. That is, the shutter guide groove 96 is formed in the vicinity of the front end part thereof such that the narrow groove 46C of the base plate part 32 and the part in the vicinity of the outer side wall of the ring-like groove 68 face with each other. Conversely, similar to the left wall 92, the right wall 94 has the right inner wall 94A contacted with the right inner wall 48A of the base plate part 32 and the right outer wall 94B faces the right outer wall 48B of the base plate part 32 so as to provide the rear part right side wall of the disk cartridge 10 and the rear part of the second guide groove 12B.

Also, a pillar 98 is provided at each position corresponding to the cylindrical projections 50 of the base plate part 32 between the circumferential wall 88 and the ring-like groove 68. The pillars 98 have the same height as the rear wall 90 of the circumferential wall 88 with the lower end surface of each contacted with the upper end surface of the cylindrical projections 50 of the base plate part 32. A screw hole 98A is provided in the center part of the pillar 98 such that the position of the position limiting hole 16 (cylindrical projection 51) can be determined with respect to the upper surface plate part 34 by screwing into the screw hole 98A a screw with the head part thereof engaged with the screw receiving part inside the cylindrical projection 50 of the base plate part 32.

Also, by the above-mentioned screwing operation, the upper surface plate part 34 in the state covering the upper part of the base plate part 32 is connected and held by the base plate part 32 so as to form the case 30 for rotatably storing the disk medium 20. In this state, the cylindrical wall 40 of the base plate part 32 is inserted into the ring-like groove 68 of the upper surface plate part 34 and the circumferential wall 42 of the base plate part 32 is contacted with the part of the upper surface plate part 34 corresponding to the circumferential wall 88.

Conversely, the lower surface plate part 36 is disposed below the base plate part 32. The lower surface plate part 36 has an external shape in substantially the same flat plate-like form as that of the flat plate part 64 of the upper surface plate part 34. Since the outer circumference thereof is made slightly smaller than the flat plate part 64, it can be fitted into the outer wall 70 of the upper surface plate part 34 and the inner circumferential surface of the circumferential wall 42 (rear wall 44, left outer wall 46B and right outer wall 48B) of the base plate part 32.

Also, in the lower surface plate part 36, an opening 100 having substantially the same shape as that of the opening 54 of the base plate part 32 is formed at a position corresponding to the opening 54. That is, the opening 100 comprises a hub hole 102 corresponding to the hub hole 56, a window part for a recording/replaying head 104 corresponding to the recording/replaying head window part 58 and right and left extending width parts 104A, 104B so as to provide the opening 14 of the disk cartridge 10.

In the lower surface plate part 36, a through hole 106 corresponding to the outer diameter of the cylindrical projection 51 of the base plate part 32 is provided at a position corresponding to the cylindrical projection 51. Also, on the upper surface of the lower surface plate part 36, a liner 108 is provided along a rim part circumferential of the opening 100 as a cleaning member for cleaning the first shutter member 110 and the second shutter member 120 (to be described later). The liner 108 is provided in the same manner as the above-mentioned liner 63 and fixed on the upper surface of the lower surface plate part 36 by adhesion.

The lower surface plate part 36 in the state with the cylindrical projection 51 of the base plate part 32 inserted through the through hole 106 and the upper surface contacted with the lower surface 38B (part excluding the recess 38C) of the base plate part 32 and the inner walls 80A, 80B of the upper surface plate part 34 is fitted and held by the circumferential wall 42 of the base plate part 32 (rear wall 44, left outer wall 46B and right outer wall 48B) and the inner circumferential surface of the outer wall 70 of the upper surface plate part 34.

According to the above-mentioned configuration, the lower part of the case 30 storing the disk medium 20 can be covered with the lower surface plate part 36. The case 30 with the lower part covered is provided with the front end part 10A and the rear end part 10B of the disk cartridge 10, the first guide groove 12A, the second guide groove 12B and the two position limiting holes 16, as mentioned above. The opening 14 of the disk cartridge 10 communicating with the opening 54 of the base plate part 32, the window part 78 of the upper surface plate part 34 and the opening 100 of the lower surface plate part 36 is formed therein.

The case 30 is provided with a shutter mechanism. The shutter mechanism is for closing or opening the opening 14. In the description below, when explaining the elements of the shutter mechanism based on the front and rear, right-left directions, directions are based on the closed state of the opening 14.

The shutter mechanism comprises the first shutter member 110. The first shutter member 110 comprises the shutter main body 112 for closing mainly the recording/replaying head window part 58 of the base plate part 32. The shutter main body 112 is made of a substantially trapezoidal thin flat plate in plan view (a rectangular shape with the front-rear direction size substantially same as the radius of the cylindrical wall 40 of the base plate part 32 and the width size slightly larger than the width size of the recording/replaying head window part 58 with the front end part provided in an arc-like shape corresponding to the cylindrical wall 40 and the right rear corner part cut away). The shutter main body 112 has a thickness size smaller than the height from the lower surface 38B of the base plate part 32 to the recess 38C (upper surface of the lower surface plate part 36) so as to be contacted lightly with the liners 63, 108 (i.e., to a degree not to prevent movement of the shutter main body 112, and the same applies hereafter).

The end surface of a hypotenuse part of the shutter main body 112 (see FIGS. 2 to 4) is provided as a butting part 112A with respect to the second shutter member 120 (to be described later). Also, the left rear corner part of the shutter main body 112 is provided with a pressuring piece 112B provided standing upward for pressuring the second shutter member 120.

The first shutter member 110 comprises an arc-like guide wall part 118. The arc-like guide wall part 118 is formed with the inner circumferential surface in an arc-like form corresponding to the outer circumferential surface of the cylindrical wall 40 of the base plate part 32 in plan view, provided standing upward from the front end part of the shutter main body 112. Also, the arc-like guide wall part 118 has the height determined such that the upper end part in the assembled state corresponds to the upper end surface of the cylindrical wall 40 (see FIG. 8A). Thus, the arc-like guide wall part 118 can be slid along the outer circumferential surface of the cylindrical wall 40 of the base plate part 32 and it can close a part (cut away part in the cylindrical wall 40 front part) of the recording/replaying head window part 58 of the base plate part 32.

Also, the arc-like guide wall part 118 has an extended part 118A to the leftward of the shutter main body 112 provided shorter and an extended part 118B to the rightward provided longer. The rightward extended part 118B is provided with a window part 118C with the lower part opened, corresponding to the window part 78 of the upper surface plate part 34. In the opening 14 opened state of the shutter mechanism, the size of each part is determined so as to have the window part 118C disposed forward.

Conversely, a shutter drawing part 116 is interlocked with the vicinity of an inner surface of a tip end part of the leftward extended part 118A of the arc-like guide wall part 118. The shutter drawing part 116 is provided as a plate-like form sufficiently thinner than the arc-like guide wall part 118, with a shutter engaging part 114 formed in a small block-like shape attached on the tip end part thereof.

As shown in FIG. 8B, the up-down direction width size of the shutter drawing part 116 and the shutter engaging part 114 each corresponds to the up-down direction size of the shutter guide groove 96 and the up-down direction size of the first guide groove 12A. Also, the outer surface side part of the arc-like guide wall part 118 with respect to the interlocking position of the extended part 118A left end part and the shutter drawing part 116 is provided as a lock engaging part 1 18D engageable with a lock pawl 138 of a lock means 130 (to be described later).

Also, the first shutter member 110 is provided by molding a resin for the shutter main body 112 (including the pressuring piece 112B) and the arc-like guide wall part 118 integrally. As the resin material, a material having a low friction coefficient and a good wearing resistance, such as a POM, can be used. Conversely, the shutter drawing part 116 interlocked with the arc-like guide wall part 118 is made of a metal thin plate, or the like so as to be provided elastically deformably in the thickness direction.

Figure 4:
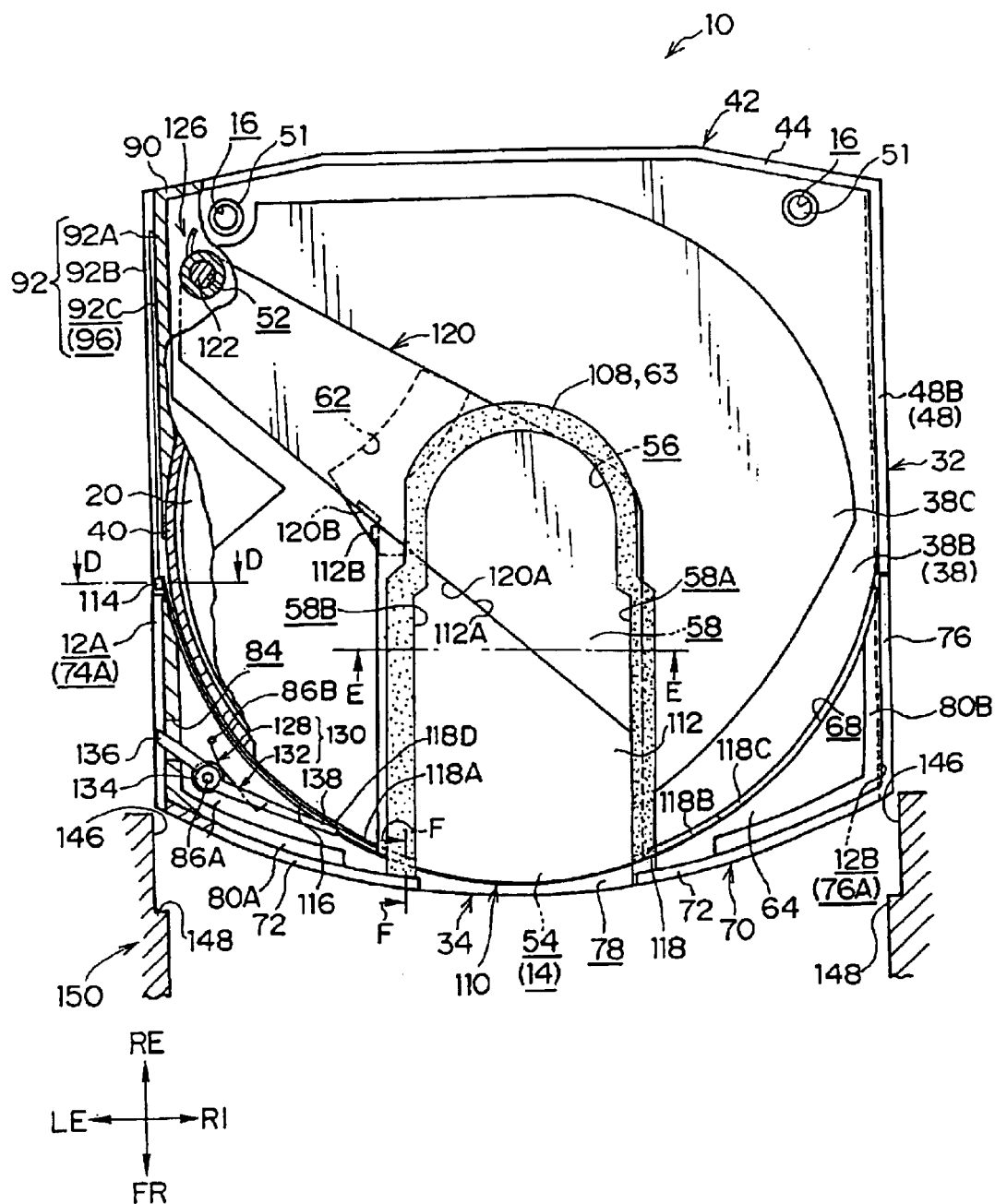
FIG. 4 is a bottom view showing the entire configuration of the disk cartridge according to the present invention in a state with an opening closed, with a lower surface plate part omitted and a part cut away.

Also, as shown in FIG. 4 (bottom view excluding the lower surface plate part 36) and FIG. 8A, the first shutter member 110 in the state with the arc-like guide wall part 118 together with the cylindrical wall 40 of the base plate part 32 inserted in the ring-like groove 68 of the upper surface plate part 34 and disposed slidably along the outer circumferential part of the cylindrical wall 40 has the shutter main body 112 disposed between the recess 38C of the base plate part 32 and the upper surface of the lower surface plate part 36 so as to close a part (mainly the recording/replaying head window part 58) of the opening 14 in an ordinary state.

In this state, the pressuring piece 112B of the shutter main body 112 is inserted into the shutter guide hole 62 of the base plate part 32 in the front part thereof. Also, in this state, the tip end part of the shutter drawing part 116 is disposed at the front end part of the shutter guide groove 96 communicating with the ring-like groove 68 of the upper surface plate part 34 and the shutter engaging part 114 is disposed at substantially the center part (rear part of the left wall 74 of the upper surface plate part 34) in the first guide groove 12A so as to be exposed to the outside. Accordingly, by moving the shutter engaging part 114 rearward from the outside, the arc-like guide wall part 118 is slid along the outer circumferential surface of the cylindrical wall 40 via the shutter drawing part 116 so as to rotate the shutter main body 112 (see FIGS. 4 to 7).

In this state, as shown in FIG. 9 and FIG. 4, the upper and lower surfaces of the shutter main body 112 of the first shutter member 110 are contacted lightly with the liners 63, 108 in the vicinity of the left side circumferential rim part of the opening 54 of the base plate part 32 and the opening 100 of the lower surface plate part 36 (that is, at the left outer part of the expanded width parts 58B, 104B).

Also, the shutter mechanism comprises a lock means 130 for limiting the rotation of the first shutter mechanism. The lock means 130 comprises a substantially L-shaped lock lever 132 in plan view. The lock lever 132 comprises a cylindrical shaft 134 disposed at the center part and supported rotatably by the pivot 86A of the upper surface plate part 34, the lock release lever 136 provided at one end part, projecting from the lock release lever hole 84 to the first guide groove 12A (lateral groove 74A) and the lock pawl 138 provided at the other end part, engageably with the lock engaging part 118D of the first shutter member 110.

Furthermore, one end part of a torsion spring 128 is stopped on the lock lever 132, and the other end part of the torsion spring 128 is inserted and held by the holding hole 86B of the upper surface plate part 34. Thus, the lock lever 132 is urged by the torsion spring 128 in the direction the lock pawl 138 is engaged with the lock engaging part 11 8D of the first shutter member 110, so as to maintain the closed state of the opening 14 in an ordinary state.

Conversely, when the lock release lever 136 is pressured rearward, the lock lever 132 is rotated around the cylindrical shaft 134, resisting urging force of the torsion spring 128 so as to release the engaging state of the lock pawl 138 and the lock engaging part 118D of the first shutter member 110.

The shutter mechanism comprises the second shutter member 120 for mainly closing the hub hole 56 of the base plate part 32. The second shutter member 120 is made of for example, a metal material such as stainless steel in a thin flat plate-form of a substantially trapezoidal shape in plan view (a trapezoidal shape defined by parallel lines longitudinally offset and separated by a long distance). The second shutter member 120 has a thickness size the same as that of the shutter main body 112 of the first shutter member 110.

Also, the end surface of a hypotenuse part of the second shutter member 120 front end provides a butting part 120A with respect to the butting part 112A of the shutter main body 112 of the first shutter member 110. A piece to be pressured 120B is provided standing upward (into the case 30) at a position in the butting part 120A corresponding to the pressuring piece 112B of the shutter main body 112. The piece to be pressured 120B corresponds to the arc-like part of the shutter guide hole 62 of the base plate part 32, and it has a width size to be always contacted with the pressuring piece 112B in the rotation range of the shutter main body 112 (moving range of the pressuring piece 112B limited by the shutter guide hole 62).

Also, the second shutter member 120 comprises a rotation shaft 122 provided standing upward on the right rear end part thereof. The rotation shaft 122 corresponds to the shutter shaft hole 52 of the base plate part 32, with a slot 124 formed on the upper end part. The rotation shaft 122 made of a resin material, or the like may be fixed and held by the second shutter member 120 by fitting, adhesion, or the like.

The second shutter member 120 in the state with the rotation shaft 122 inserted through the shutter shaft hole 52 of the base plate part 32 and the piece to be pressured 120B inserted in the shutter guide hole 62 is disposed between the recess 38C of the base plate part 32 and the upper surface of the lower surface plate part 36. In this state, one end part of the torsion spring 126 is stopped on the slot 124 of the rotation shaft 122 and the other end part of the torsion spring 126 is stopped on the spring holding part 53 of the base plate part 32 so as to have the second shutter member 120 always urged to a direction of butting with the first shutter member 110.

Thus, the second shutter member 120 in an ordinary state has the butting part 120A thereof in the butting state with the butting part 112A of the first shutter member 110, and in this state it closes mainly the hub hole 56 of the base plate part 32. That is, as shown in FIG. 1B, the first shutter member 110 and the second shutter member 120 close the opening 14 of the disk cartridge 10 in the state with the butting parts 112A, 120A butted with each other.

In this state, the pressuring piece 112B of the first shutter member 110 and the piece to be pressured 120B of the second shutter member 120 are engaged each with the front end inner rim of the shutter guide hole 62 of the base plate part 32 so as to maintain the butting state of the butting parts 112A, 120A. Also, in this state, as shown in FIGS. 9 and 4, the upper and lower surfaces of the second shutter member 120 are contacted lightly with the liners 63, 108 (to a degree not to prevent movement of the second shutter member 120, and the same applies hereafter) on the right side of the opening 54 of the base plate part 32 and the opening 100 of the lower surface plate part 36 (right outer part of the expanded width parts 58A, 104A) and in the vicinity of the circumferential rim part of the hub holes 56, 102.

Next, the operation of this embodiment will be explained. According to the disk cartridge 10 of the above-mentioned configuration, when the disk medium 20 is not being used, the opening 14 is closed by the first shutter member 110 and the second shutter member 120. That is, as shown in FIG. 4, the butting part 112A of the first shutter member 110 and the butting part 120A of the second shutter member 120 are butted with each other (contacted), the first shutter member 110 closes mainly the window for a recording/replaying head 58 of the base plate part 32 and the second shutter member 120 closes mainly the hub hole 56 of the base plate part 32.

At this time, by engaging the lock pawl 138 of the lock means 130 with the lock engaging part 118D of the arc-like guide wall part 118 so as to limit the rotation in the opening direction of the opening 14, the first shutter member 110 maintains the above-mentioned closed state. Conversely, the second shutter member 120 is forced to the butting direction with the first shutter member 110 by the torsion spring 126 so as to maintain the above-mentioned closed state. Thus, entrance of dust and the like into the disk cartridge 10 at the time the disk medium 20 is not being used, that is, adhesion of dust and the like to the lower surface (recording surface) 24 of the disk medium 20 can be prevented.

The disk cartridge 10 is mounted to the drive device 150 at the time of using the disk medium 20 (at the time of recording information to the disk medium 20 or at the time of relaying information recorded in the disk medium 20). In mounting the disk cartridge 10 to the drive device 150, it is inserted into the insertion opening 146 of the drive device 150 with the front end part 10A thereof leading (see FIGS. 4 to 7).

According to the inserting operation, the guide projection parts 148 of the drive device 150 are inserted into the first guide groove 12A and the second guide groove 12B of the disk cartridge 10. The guide projection part 148 inserted into the first guide groove 12A is moved relatively rearward of the first guide groove 12A by further insertion of the disk cartridge 10 so as to be contacted with the lock release lever 136 disposed in the first guide groove 12A for pressuring the same rearward.

As shown in FIG. 5, when the lock release lever 136 is pressured rearward, the lock lever 132 is rotated around the cylindrical shaft 134 (pivot 86A) so as to have the lock release lever 136 withdrawn into the lock release lever hole 84 and the engaged state of the lock pawl 138 and the lock engaging part 118D of the arc-like guide wall part 118 is released. Thus, the lock state of the first shutter member 110 is released so as to have the first shutter part 110 freely rotatable.

Figure 6:
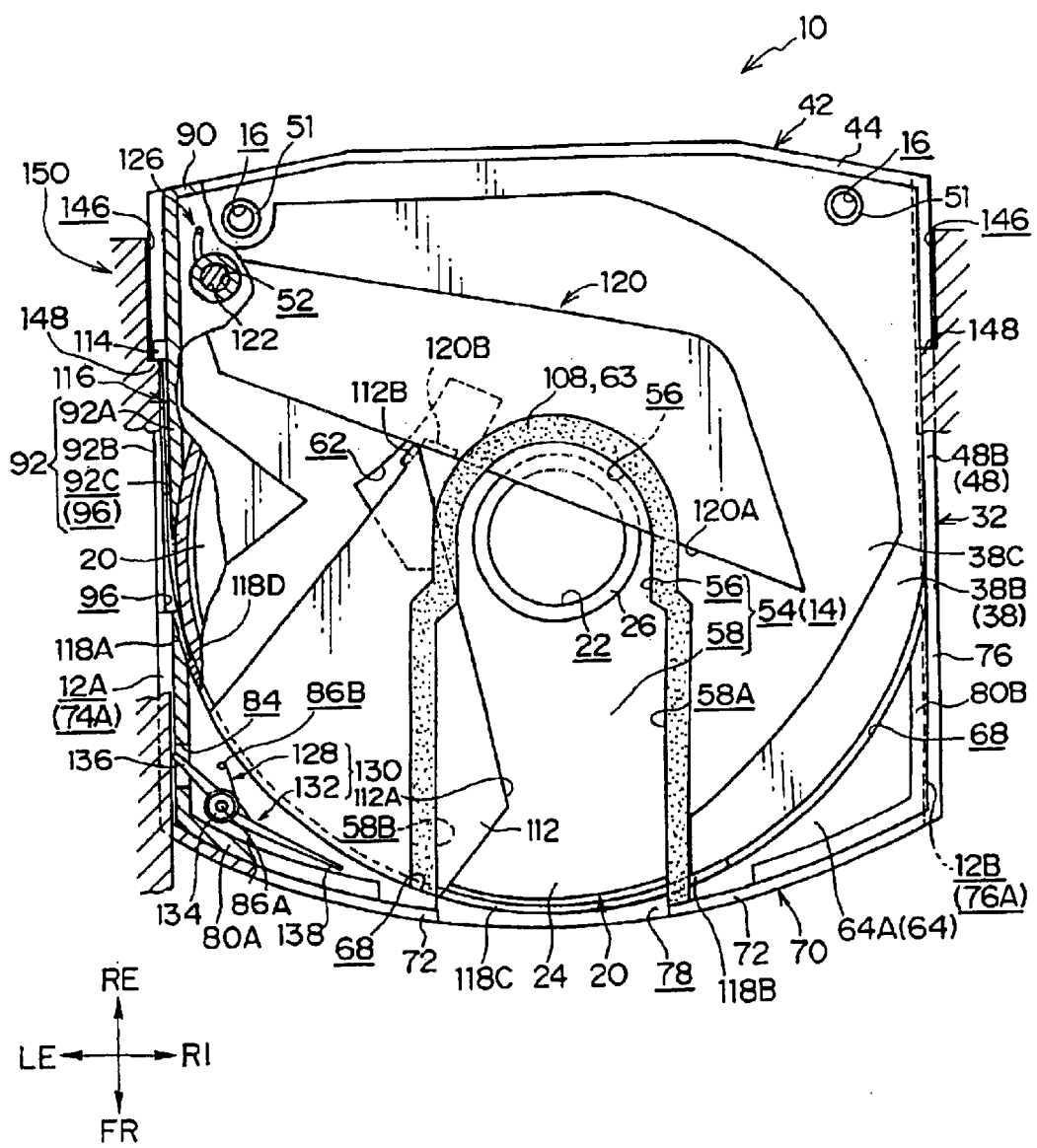
FIG. 6 is a view corresponding to FIG. 4 showing an opening process of the opening of the disk cartridge according to the present invention.

When the guide projection part 148 of the drive device 150 is moved further relatively rearward in the first guide groove 12A, the guide projection part 148 is engaged with the shutter engaging part 114 disposed in the first guide groove 12A so as to pressure the same rearward while maintaining the above-mentioned lock release state. When the shutter engaging part 114 is pressured rearward, as shown in FIG. 6, the first shutter member 110 with the lock state released is rotated.

That is, due to the rearward movement of the shutter engaging part 114, since the shutter drawing part 116 moves rearward in the shutter guide groove 96 extending in the cylindrical wall 40 tangent direction, the arc-like guide wall part 118 is rotated while being slid along the outer circumferential surface of the cylindrical wall 40. According to the rotation of the arc-like guide wall part 118, the shutter main body 112 provided integrally therewith is rotated along the cylindrical wall 40 (around the axis of the cylindrical wall 40).

Also, according to the rotation of the first shutter member 110, the pressuring piece 112B of the shutter main body 112 is moved substantially rearward in the shutter guide hole 62 (the pressuring piece 112B provided away from the axis of the cylindrical wall 40 is rotated around the axis of the cylindrical wall 40). When the pressuring piece 112B is moved substantially rearward, the piece to be pressured 120B of the second shutter member disposed contacted therewith is moved along the arc-like part of the shutter guide hole 62 while being pressured substantially rearward. According to the movement of the piece to be pressured 120B, the second shutter member 120 is rotated around the rotation shaft 122, resisting the urging force of the torsion spring 126, in the direction away from the first shutter member 110.

Figure 7:
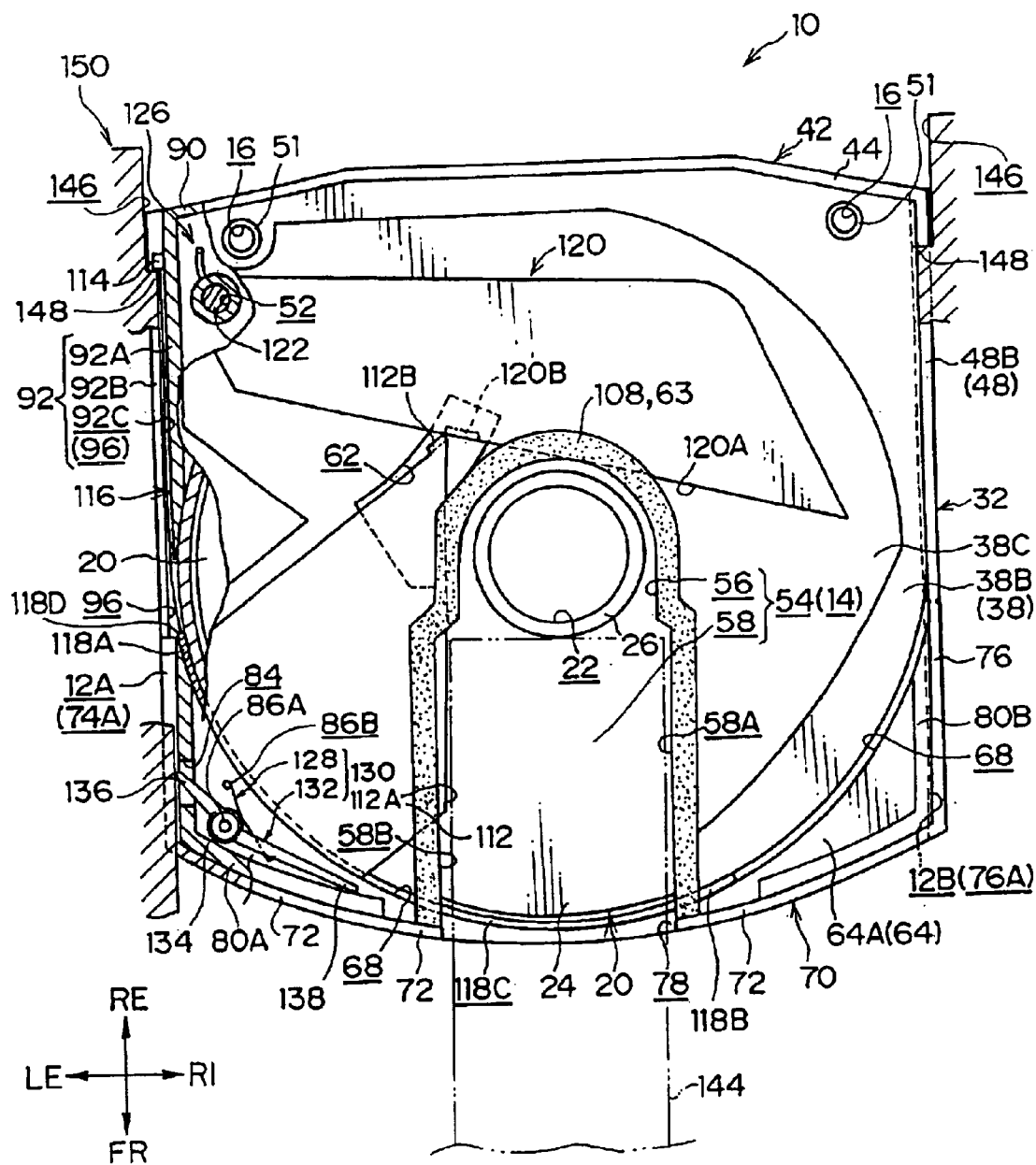
FIG. 7 is a view corresponding to FIG. 4 showing an opening state of the opening of the disk cartridge according to the present invention.

When the guide projection part 148 of the drive device 150 is moved further relatively rearward in the first guide groove 12A while being engaged with the shutter engaging part 114 (while pressuring the shutter engaging part 114 rearward), as shown in FIG. 7, the first shutter member 110 (shutter main body 112 and the arc-like guide wall part 118) and the second shutter member 120 are further rotated so as to open the recording/replaying head window part 58 and the hub hole 56. In this state, the window part 118C of the arc-like guide wall part 118 is disposed on the front part of the disk cartridge 10 and the front part of the recording/replaying head window part 58 is opened through the window part 78 of the upper surface plate part 34 as well. That is, the opening 14 of the disk cartridge 10 is opened.

According to the above-mentioned operation, by moving (rotating) the first shutter member 110 and the second shutter member 120 in different directions while moving the butting parts 112A, 120A thereof away, the opening 14 of the disk cartridge 10 can be opened largely while keeping the shutter moving area small.

When the disk cartridge 10 is inserted to a predetermined position of the drive device 150, the positioning mechanism of the drive device 150 is inserted into the position limiting hole 16 for accurate positioning. Thus, the disk cartridge 10 cannot be further inserted and closure of the opening 14 by the urging force of the torsion spring 126 and the movement of the disk cartridge 10 in the discharging direction (insertion opening 146 side) are inhibited.

In this state, a rotation spindle shaft 142 (see FIG. 11) is inserted from a part corresponding to the hub hole 56 of the opening 14 with the closed state released. The rotation spindle shaft 142 holds the center core part 26 of the disk medium 20 at the tip end part by engagement, adsorption, or the like and rotates the disk medium 20 around the axis.

Also, the recording/replaying head 144 is inserted from a part corresponding to the recording/replaying head window part 58 of the opening 14 for recording information on the recording surface of the disk medium 20 or reproducing the information recorded on the recording surface.

Conversely, at the time of discharging the disk cartridge 10 from the drive device 150, the positioning mechanism is taken out from the position limiting hole 16 so as to allow movement in the discharging direction (insertion opening 146 side). In this state, by the urging force of the torsion spring 126 or the pressuring force in the discharging direction applied from the drive device 150, the disk cartridge 10 is moved with the rear end part 10B leading. Due to the movement, the shutter engaging part 114 is engaged with the guide projection part 148 of the drive device 150 and the pressuring force via the guide projection part 148 is not applied, so the first shutter member 110 is in a rotatable state.

In this state, as mentioned above, the disk cartridge 10 closes the opening 14 while being moved in the discharging direction. That is, the second shutter member 120 is rotated in the closing direction of the opening 14 while pressuring the pressuring piece 112B of the first shutter member 110 substantially forward at the piece to be pressured 120B by the urging force of the torsion spring 126. Also, the first shutter member 100 pressured substantially forward at the pressuring piece 112B is rotated in the closing direction of the opening 14 by the pressure.

When the first shutter member 110 and the second shutter member 120 are each rotated so as to return to the initial positions, the opening 14 is closed. The pressuring piece 112B of the first shutter member 110 returned to the initial position is engaged with the front part inner rim of the shutter guide hole 62 so as to inhibit further rotation by the urging force of the torsion spring 126 of the second shutter member 120 contacted with the pressuring piece 112B at the first shutter member 110 and the piece to be pressured 120B.

The rotation beyond the initial position of the first shutter member 110 and the second shutter member 120 may be inhibited also by engaging the piece to be pressured 120B of the second shutter member 120 with the circumferential rim part of the shutter guide hole 62 at the initial position, or it may be inhibited also by engaging the extended part 118B tip end part of the arc-like guide wall part 118 of the first shutter member 110 with the wide end part of the ring-like groove 68 at the initial position. Also, the first shutter member 110 may be returned to the initial position by pressuring the shutter engaging part 114 by the drive device 150.

When the disk cartridge 10 is moved further in the discharging direction and the guide projection part 148 is moved forward with respect to the lock release lever hole 84 of the first guide groove 12A, the lock lever 132 is rotated by the urging force of the torsion spring 128 so that the lock release lever 136 is projected into the first guide groove 12A and the lock pawl 138 is engaged with the lock engaging part 118D of the first shutter member 110. Thus, the disk cartridge 10 is returned to the state before the mounting operation to the drive device 150 and the rotation of the first shutter member 110 is inhibited so as to maintain the closed state of the opening 14.

In this state, the disk cartridge 10 is stored, transported, or the like. Consequently thereto, for example, dust and the like in the atmosphere may be adhered to the lower surfaces of the shutter main body 112 of the first shutter member 110 and the second shutter member 120. However, since the liner 108 is fixed and provided on the upper surface of the lower surface plate part 36 and lightly contacted with the shutter main body 112 of the first shutter member 110 and the second shutter member 120, at the time of mounting again into the drive device 150, the lower surfaces of the shutter main body 112 of the first shutter member 110 and the second shutter member 120 each rotated according to the opening operation of the opening 14 are wiped (cleaned) by the liner 108.

That is, dust and the like adhered to the lower surfaces of the shutter main body 112 of the first shutter member 110 and the second shutter member 120 at the time of storage, transportation, or the like can be eliminated by the liner 108 so that entrance of dust and the like into the disk cartridge 10 (case 30) via the shutter main body 112 of the first shutter member 110 and the second shutter member 120 can be prevented. According to the disk cartridge 10 of this embodiment, entrance of dust and the like via the shutter main body 112 of the first shutter member 110 and the second shutter member 120 can be prevented so as to provide a good dustproofing.

Also, according to the disk cartridge 10, since the liner 63 is fixed and provided in the state lightly contacted with the shutter main body 112 of the first shutter member 110 and the second shutter member 120 also in the recess 38C of the base plate part 32, the upper surfaces of the shutter main body 112 of the first shutter member 110 and the second shutter member 120 to be each rotated according to the opening operation of the opening 14 are wiped (cleaned) by the liner 63. Thus, since dust and the like existing slightly in the disk cartridge 10 and adhered on the upper surfaces of the shutter main body 112 of the first shutter member 110 and the second shutter member 120 can be eliminated, the dustproofing can further be improved.

Furthermore, since the wiping (cleaning) operation by the liners 63, 108 can be executed also at the time of the closing operation of the opening 14, dust and the like entered into the drive device 150 in the opened state of the opening 14 and adhered on the upper and lower surfaces of the shutter main body 112 of the first shutter member 110 and the second shutter member 120 can be eliminated as well. Also, since the liners 63, 108 are provided each along the circumferential rim part of the openings 54, 100, the part of the main body part 112 of the first shutter member 110 and the second shutter member 120 exposed to the outside in the closed state of the opening 14 (that is, the part having dust and the like easily adhered) can be reliably wiped (cleaned) at the time of being stored between the recess 38C of the base plate part 32 and the upper surface of the lower surface plate part 36.

Also, by the liners 63, 108 provided along the circumferential rim parts of the openings 54, 100, the gap between the upper surface of the shutter main body 112 of the first shutter member 110 and the second shutter member 120, and the recess 38C of the base plate part 32, and the gap between the lower surface of the shutter main body 112 of the first shutter member 110 and the second shutter member 120, and the upper surface of the lower surface plate part 36 can be closed. Therefore, entrance of dust and the like from the above-mentioned gaps without the opening and closing operation of the opening 14 (for example, entrance of dust and the like at times of storage and transportation of the disk cartridge 10) can be prevented as well. Accordingly, the dust amount remaining in the disk cartridge 10 can be extremely reduced.

Also, since the contact state of the liners 63, 108 with respect to the shutter main body 112 of the first shutter member 110 and the second shutter member 120 is light, the rotation of the first shutter member 110 and the second shutter member 120 cannot be prevented by the liners 63, 108 SO that the first shutter member 110 and the second shutter member 120 can be rotated smoothly.

Furthermore, since the liners 63, 108 are made of a non-woven fabric, the cleaning property (eliminating property) for dust and the like adhered on the upper and lower surfaces of the shutter main body 112 of the first shutter member 110 and the second shutter member 120, and the detachment preventing property (holding property) of the eliminated dust and the like can both be provided preferably. In particular, since the non-woven fabric is provided in a two layer structure including the layer on the side contacted with the shutter main body 112 of the first shutter member 110 and the second shutter member 120 made of a fiber with a good eliminating property (including combinations thereof, and the same applies hereafter), and the layer on the adhesion side made of a fiber with a good holding property, the above-mentioned eliminating property and holding property can further be improved, and thus it is preferable.

Also, since the liners 63, 108 are provided corresponding to each rotation direction of the shutter main body 112 of the first shutter member 110 and the second shutter member 120, in other words, since the shutter main body 112 of the first shutter member 110 is wiped by the left side parts of the liners 63, 108, and the second shutter member 120 is wiped by the right side parts of the liners 63, 108 and the arc-like part (part around the hub holes 56, 102), imbalance of the dust amount held in each part of the liners 63, 108 can be alleviated (the holding amount of dust and the like is averaged) so that the life of the liners 63, 108 can be prolonged.

Although the liners 63, 108 are provided each on the upper surface of the recess 38C of the base plate part 32 and the lower surface plate part 36 in the above-mentioned embodiment, the present invention is not limited thereto, and thus for example the liner 63 or the liner 108 can be provided on either the recess 38C of the base plate part 32 or the upper surface of the lower surface plate part 36. In this case, it is preferable to provide the liner 108 only on the upper surface of the lower surface plate part 36 for wiping off the outer surface of the first shutter member 110, or the like exposed to the outside at the time of not using the disk medium 20 (at times of storage or the like).

Also, although the liners 63, 108 are provided preferably in the opening 54, 100 circumferential rim part in the above-mentioned embodiment, the present invention is not limited thereto, and the liners 63, 108 can be provided in any part as long as they can wipe off the shutter main body 112 of the first shutter member 110 and the second shutter member 120. The liners 63, 108 are not limited to be provided continuously along the circumferential rim part of the openings 54, 100 and they can be provided in an optional divided form.

Although the liners 63, 108 are provided preferably as a two layer structure non-woven fabric in the above-mentioned embodiment, the present invention is not limited thereto, and the liners 63, 108 can be provided as a non-woven fabric, for example, of a single layer, or three or more layers. Also, the liners 63, 108 may be provided optionally as a material other than the non-woven fabric. However, a non-dust generating material that does not generate dust and the like therefrom, like a non-woven fabric, is preferable since the dust amount in the disk cartridge 10 can be reduced.

Although the opening 14 is opened or closed by the first shutter member 110 and the second shutter member 120 in the above-mentioned embodiment, the present invention is not limited thereto, and for example, the opening 14 can be opened or closed by one shutter member. Also, the materials each comprising the first shutter member 110 and the second shutter member 120 are not limited to the resin material and the metal material shown in the above-mentioned embodiment. Therefore, for example, the first shutter member (including a part of the shutter main body 112, or the like) may comprise a metal material, and the second shutter member 120 may comprise a resin material.

Also, although the disk medium 20 is provided as a one side recording type with the opening 14 provided downward (and forward) in the above-mentioned embodiment, the present invention is not limited thereto, and for example, the disk medium 20 can be provided as a double side recording type with the opening 14 provided also upward and the shutter members disposed for opening and closing up and down openings. Also, the opening 14 is not limited to the configuration with the hub hole 56 and the recording/replaying head window part 58 communicating with each other, and they can be formed independently. The disk medium 20 is not limited to the configuration having the center core part 26, and the disk medium 20 can be held by the rotation spindle shaft 142 at the center hole 22.

Next, the drive device capable of eliminating dust and the like adhered on the recording surface (lower surface) 24 of the disk medium 20, and the disk cartridge 10 adopted thereto will be explained.

As shown in FIGS. 7 and 11A to 11D, the drive device 150 according to the present invention comprises the rotation spindle shaft 142, the recording/replaying head (such as a laser head) 144, and a cartridge holder 140 such that the rotation spindle shaft 142 is inserted from the opening 14 of the disk cartridge 10 held by the cartridge holder 140 at the time the disk medium 20 is being used and the recording/replaying head 144 is approached for recording/replaying the information with respect to the disk medium 20.

The rotation spindle shaft 142 is provided movable to a holding position for holding the center core part 26 of the disk medium 20 by adsorption or engagement, a contact position for contacting the recording surface (lower surface) 24 of the disk medium 20 with a liner 82 which is a cleaning member, and a drive position for always rotating the disk medium 20.

Figure 10A:
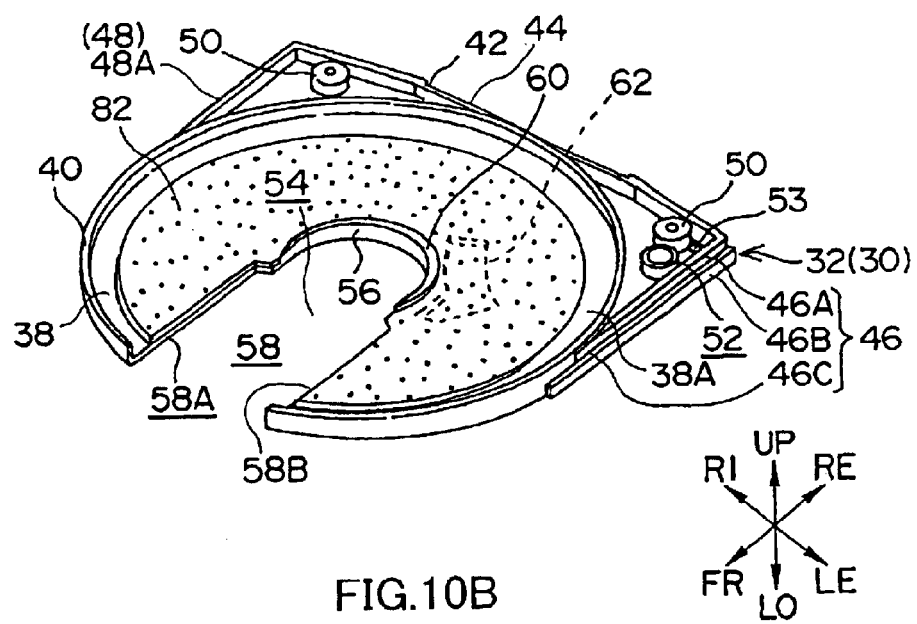
FIGS. 10A and 10B are perspective views showing a base plate part of a disk cartridge of another embodiment according to the present invention.
Figure 10B:
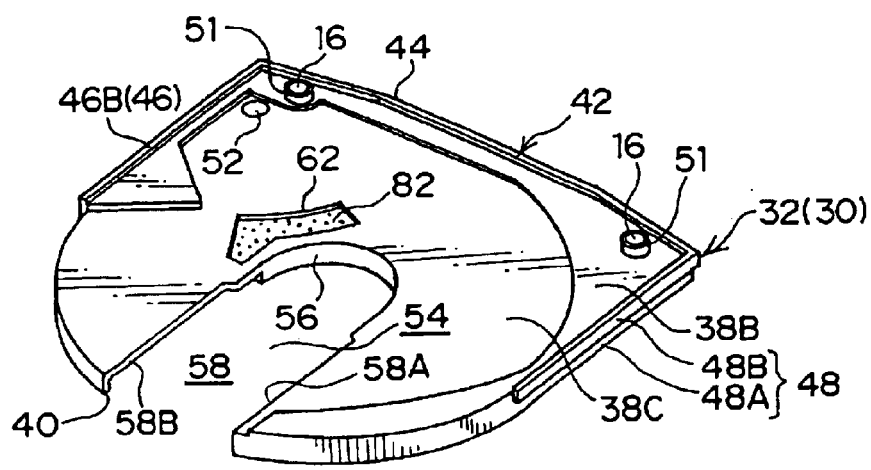

Also, as shown in FIG. 10, the disk cartridge 10 to be used preferably in the drive device 150 is a disk cartridge 10 with the liner 82 as a cleaning member attached on the upper surface 38A of the base plate part 32. The liner 82 is made of the same non-woven fabric as the above-mentioned liners 63, 108. The nap of the liner 82 is arranged along the radial direction of the recording surface (lower surface) 24 of the disk medium 20. The liner 82 shown in the figure is formed in substantially the same size as the recording surface (lower surface) 24 of the disk medium 20 excluding the area facing the recording/replaying head window part 58 (i.e., in a substantially similar shape as the upper surface 38A of the cylindrical wall 40 inner side and a size slightly smaller than the same).

The liner 82 is not limited to being made of the above-mentioned non-woven fabric, and it may be made of a woven fabric or the like that satisfies the condition of preferably eliminating and holding dust and the like by adsorption or the like. In any case, the liner 82 made of a non-dust generating material, such as a non-woven fabric not generating dust and the like therefrom can be used most preferably.

Also, the liner 82 is made in a thickness (height) so as not to be contacted with the recording surface (lower surface) 24 at the time of recording/replaying the disk medium 20. That is, the disk medium 20 is held at an elevated position by the rotation spindle shaft 142 at the time of recording/replaying, and the liner 82 is formed in a thickness (height) of a non-contact state with the recording surface (lower surface) 24. Therefore, a problem of re-adhesion of dust and the like scavenged by the liner 82 to the disk medium 20 can be prevented.

Figure 11A:
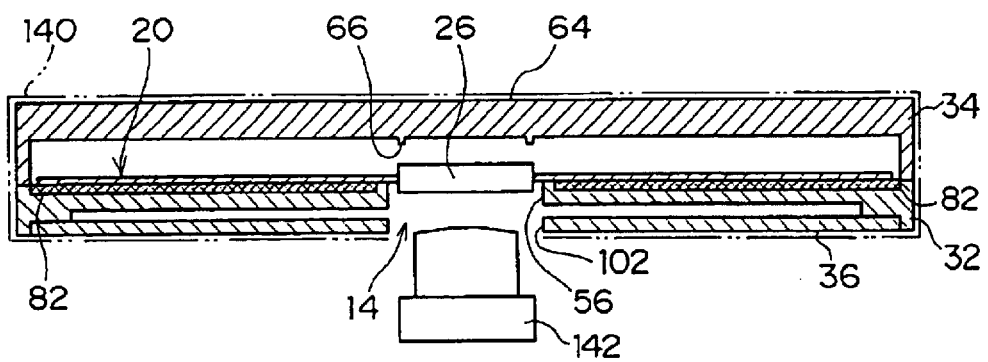
FIGS. 11A to 11D are schematic explanatory views of a disk cartridge being cleaned by a drive device according to the present invention.

Here, the operation of the drive device 150 for preferably cleaning the recording surface (lower surface) 24 of the disk medium 20 by the liner 82 will be explained with reference to FIGS. 11A to 11D. First, as shown in FIG. 11A, the disk medium 20 in the disk cartridge 10 is placed on the liner 82 by its own weight. When the disk cartridge 10 is mounted in the drive device 150, according to the above-mentioned step, the opening 14 is opened so that the tip end of the rotation spindle shaft 142 inserted from the hub holes 102, 56 holds the center core part 26 of the disk medium 20 by engagement or adsorption.

Figure 11B:
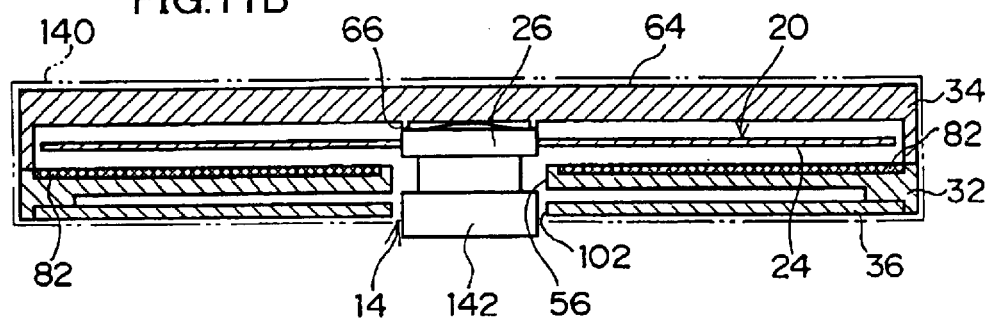
Figure 11C:
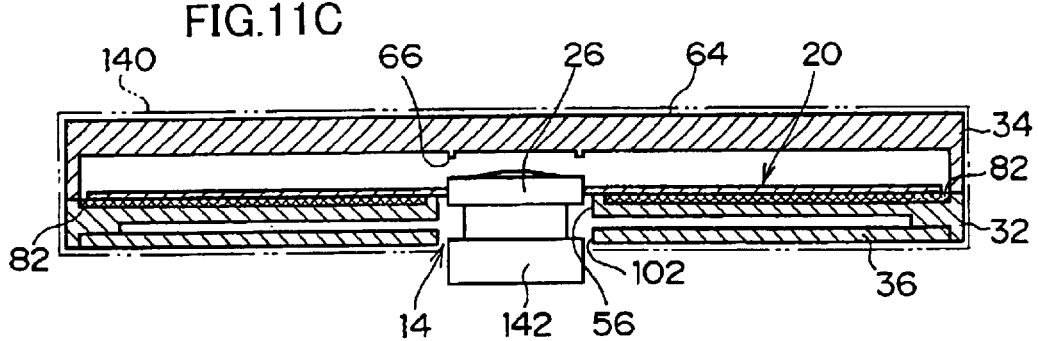

At this time, as shown in FIG. 11B, the rotation spindle shaft 142 holds the disk medium 20 at the holding position while slightly lifting up the same, but it may hold the same without lifting it up. Thereafter, in an ordinary configuration, it is held at the drive position so as to be constantly rotated at a predetermined rate for recording/replaying the information. However, according to the present invention, as shown in FIG. 11C, the rotation spindle shaft 142 is temporarily lowered while holding the disk medium 20. That is, the disk medium 20 is lowered forcibly to the lowermost position (contact position) so as to have the recording surface (lower surface) 24 of the disk medium 20 sufficiently contacted with the liner 82 attached on the upper surface 38A of the base plate part 32.

Figure 11D:
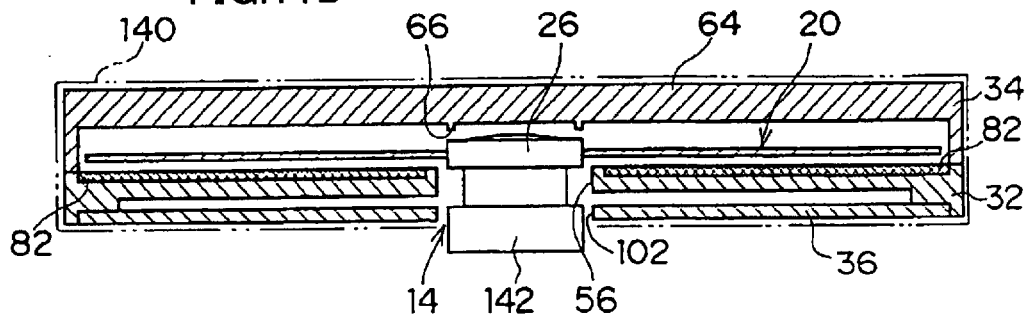

Thereafter, with the disk medium 20 rotated a predetermined amount at an appropriate rate by the rotation spindle shaft 142, dust and the like adhered on the recording surface (lower surface) 24 of the disk medium 20 are wiped and eliminated by the liner 82. The recording surface (lower surface) 24 can be cleaned extremely effectively by the wiping operation so that dust and the like adhered on the recording surface (lower surface) 24 can be eliminated preferably. After cleaning the recording surface (lower surface) 24 of the disk medium 20 accordingly, the disk medium 20 is raised by the rotation spindle shaft 142 so as to be held at the drive position in a state of non-contact with the liner 82 as shown in FIG. 11D.

Thereafter, when recording/replaying the information with respect to the disk medium 20, as in an ordinary configuration, the disk medium 20 can be rotated constantly at a predetermined rate in this state and the recording/replaying head 144 is approached to the recording surface (lower surface) 24 thereof for recording/replaying information. In any case, since dust and the like are not adhered to the recording surface (lower surface) 24 of the disk medium 20 at the time of recording/replaying, generation of error (dropouts) by dust and the like can be extremely reduced.

Also, although the rotation spindle shaft 142 is raised or lowered in the above-mentioned embodiment, the same effect can be obtained also by raising or lowering the cartridge holder 140 holding the disk cartridge 10. As means for raising or lowering the rotation spindle shaft 142 or the cartridge holder 140, known means can be used. That the targeted wiping (cleaning) operation for the recording surface (lower surface) 24 of the disk medium 20 can be carried out by raising or lowering the rotation spindle shaft 142 or the cartridge holder 140 is advantageous in that a mechanism therefor and the like can be provided simply.

Also, the rotational frequency or the like of the rotation spindle shaft 142 can be controlled by appropriate means. That is, the rotational frequency of the rotation spindle shaft 142 depends on the width of the liner 82 provided along the radial direction of the recording surface (lower surface) 24 of the disk medium 20. As shown in FIG. 10, when it is formed in substantially the same size as that of the recording surface (lower surface) 24 of the disk medium 20 excluding the area facing the recording/replaying head window part 58, the entirety of the recording surface (lower surface) 24 can be cleaned sufficiently and simply by a slight rotational amount for wiping the area facing the recording/replaying head window part 58 (less than a half turn), however, when it has substantially the same width as that of the liners 108, 63 shown in FIGS. 4 to 7, at least about one turn is needed for preferably cleaning the entirety of the recording surface (lower surface) 24.

That is, depending on the width thereof, the liner 82 can wipe off (clean) dust and the like adhered on the recording surface (lower surface) 24 of the disk medium 20 by rotating by one turn at most. Accordingly, since the entirety of the recording surface (lower surface) 24 of the disk medium 20 can be cleaned sufficiently and certainly by rotating the same by a rotational frequency at least capable of wiping off the area corresponding to the recording/replaying head window part 58 and less than one turn, a trouble of damaging the recording surface (lower surface) 24 thereof by the liner 82 is not generated.

In any case, as long as dust and the like adhered on the recording surface (lower surface) 24 of the disk medium 20 can be collected and eliminated preferably, it is not limited to the embodiments shown in the figures, and design of the rotational frequency of the rotation spindle shaft 142 for cleaning the recording surface (lower surface) 24 of the disk medium 20, the size and material of the liner 82, or the like can be changed optionally.

The disk cartridge according to the present invention provides the excellent effect of preventing entrance of the dusts via the shutter member with a good dustproofing. Moreover, since the drive device according to the present invention can collect and eliminate dust and the like adhered on the disk medium preferably at the time of mounting the disk cartridge for recording/replaying, generation of an error (dropout) can be reduced at the time of recording or reproduction.

What is claimed is:

1. A disk cartridge comprising:
    a medium;
    a case accommodating the medium and having an access opening for exposing the medium to the environment;
    a cover plate mounted on an outer surface of the case and having an opening corresponding to the access opening;
    a shutter disposed between the case outer surface and the cover plate for opening and closing the opening of the cover plate and the access opening; and
    a cleaner disposed between the shutter and at least one of the case outer surface and the cover plate for wiping the shutter.

2. The disk cartridge of claim 1, wherein the shutter is wiped by the cleaner during opening and closing of the shutter.

3. The disk cartridge of claim 1, wherein the first and second shutter members are relatively movable toward and away from one another for opening and closing the shutter.

4. The disk cartridge of claim 1, wherein the cleaner comprises a cleaning member including non-dust generating material.

5. The disk cartridge of claim 1, wherein the cleaner comprises a cleaning member including non-woven fabric.

6. The disk cartridge of claim 1, wherein the case includes two case elements.

7. The disk cartridge of claim 6, wherein the cleaner comprises a cleaning member attached to one of the case elements.

8. The disk cartridge of claim 1, wherein the cleaner comprises a cleaning member attached to the cover plate.

9. A disk cartridge comprising:
   a medium;
   a case accommodating the medium such that the medium is movable between a first position and a second position, the medium in the first position forms a plane which is parallel to a plane formed by the medium when in the second position; and
   a cleaning member disposed inside the case for wiping the medium,
   wherein at the first position the medium surface-contacts the cleaning member, and at the second position the medium is not in contact with the cleaning member,
   wherein the case includes an access opening for exposing the medium to the environment; and
   further comprising a shutter for opening and closing the access opening,
   wherein the shutter comprises relatively movable first and second shutter members which move in response to one another.

10. The disk cartridge of claim 9, further comprising a cleaner for wiping the shutter.

11. The disk cartridge of claim 9, wherein the cleaning member includes non-dust generating material.

12. The disk cartridge of claim 9, wherein the cleaning member includes non-woven fabric.

13. A drive device to which a disk cartridge is detachably mountable, the disk cartridge including a medium, a case accommodating the medium such that the medium is movable between a first position and a second position, and a cleaning member disposed inside the case for wiping the medium, at the first position the medium surface-contacting the cleaning member and at the second position the medium being not in contact with the cleaning member, the drive device comprising:
   a shift mechanism engageable with the medium of the mounted disk cartridge and capable of moving the medium between the first position and the second position, the shift mechanism being provided at a center of the medium; and
   a rotating mechanism capable of rotatably driving the medium at each of the first position and the second position,
   wherein the case includes an access opening for exposing the medium to the environment;
   further comprising a shutter for opening and closing the access opening,
   wherein the shutter comprises relatively movable first and second shutter members which move in response to one another.

14. The drive device of claim 13, further comprising a cartridge holder in which the disk cartridge is mountable.

15. The drive device of claim 13, further comprising a spindle shaft which is movable for moving the medium between the first position and the second position and is rotationally drivable.

* * * * *